United States Patent Office.

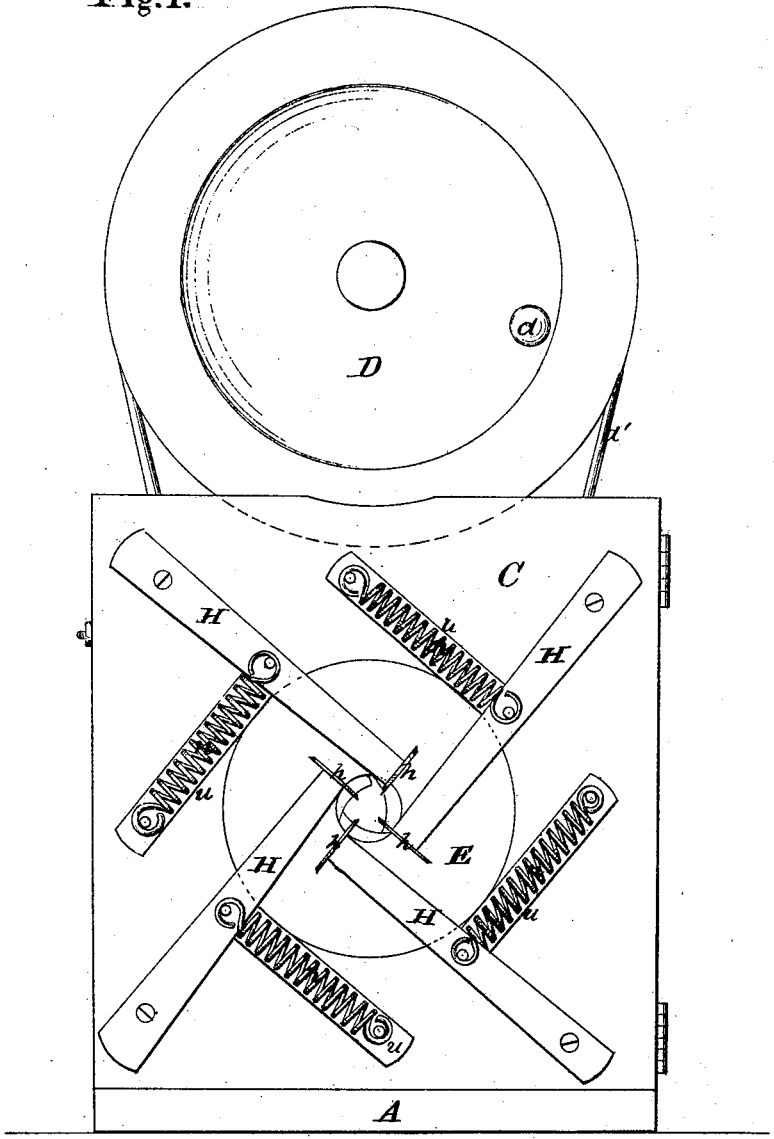

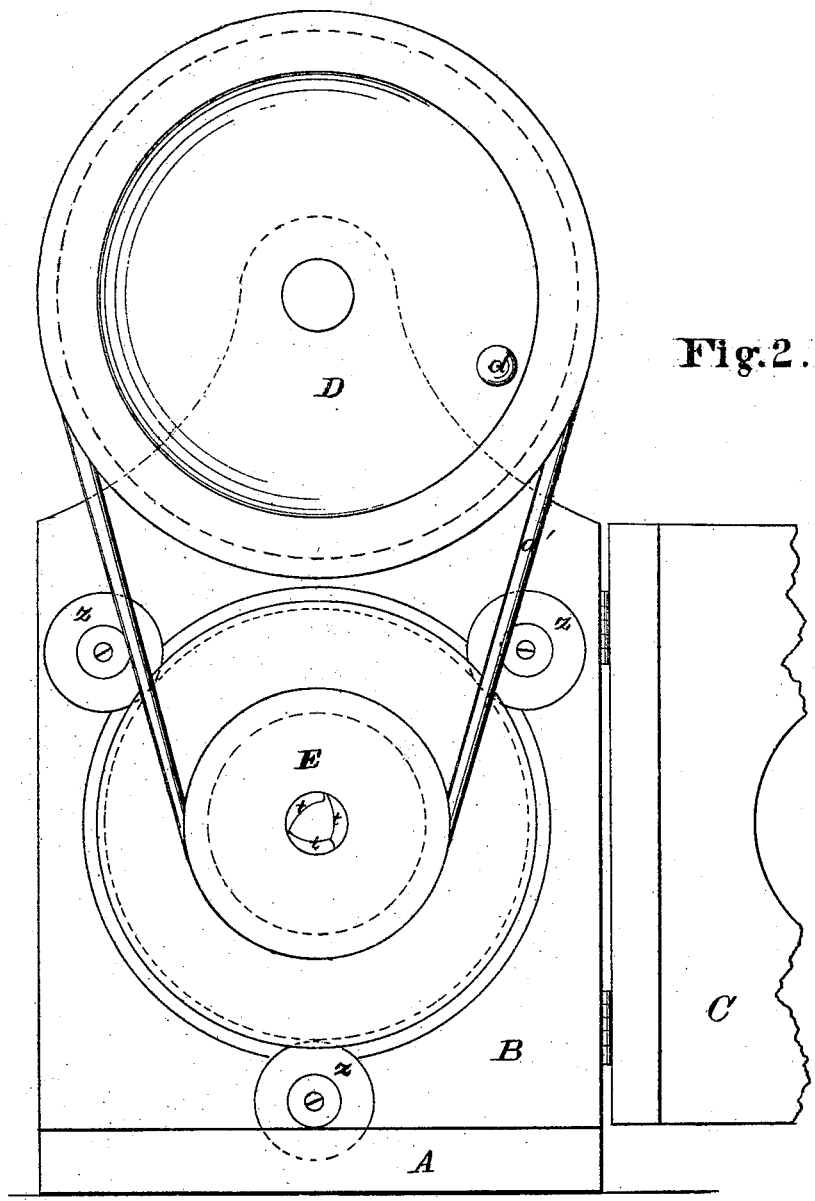

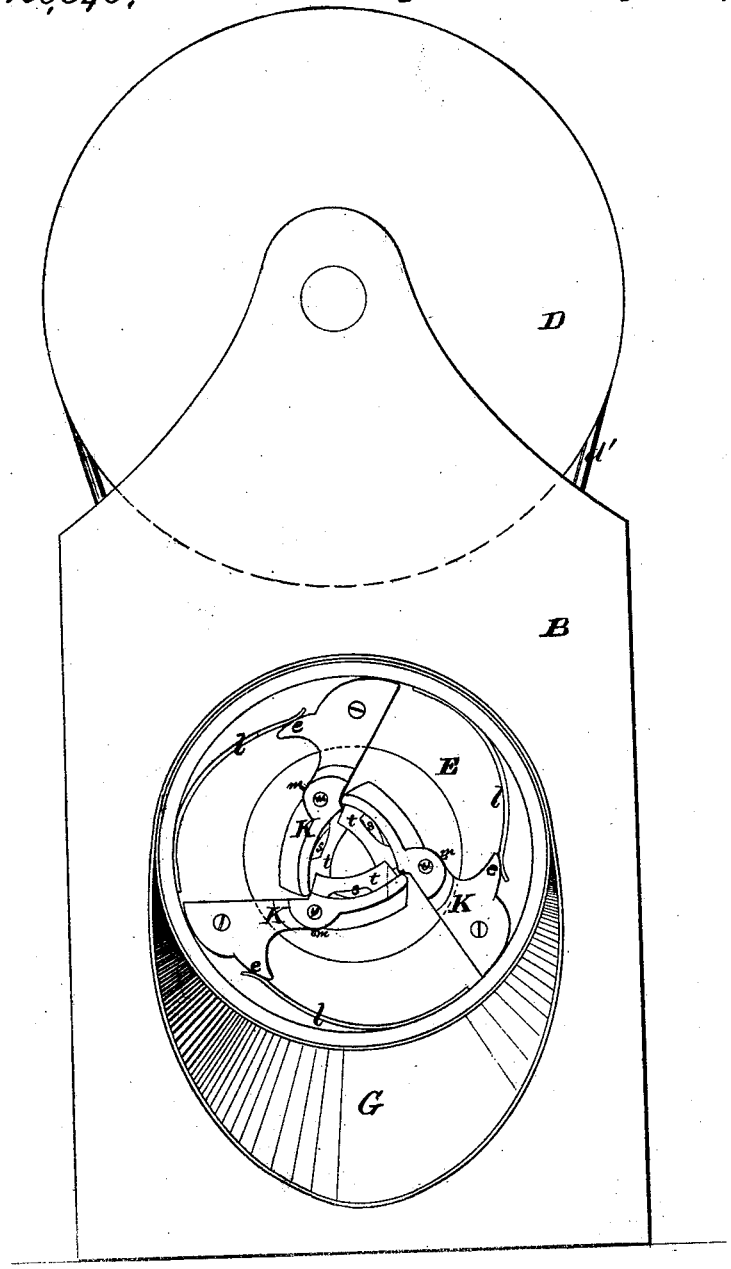

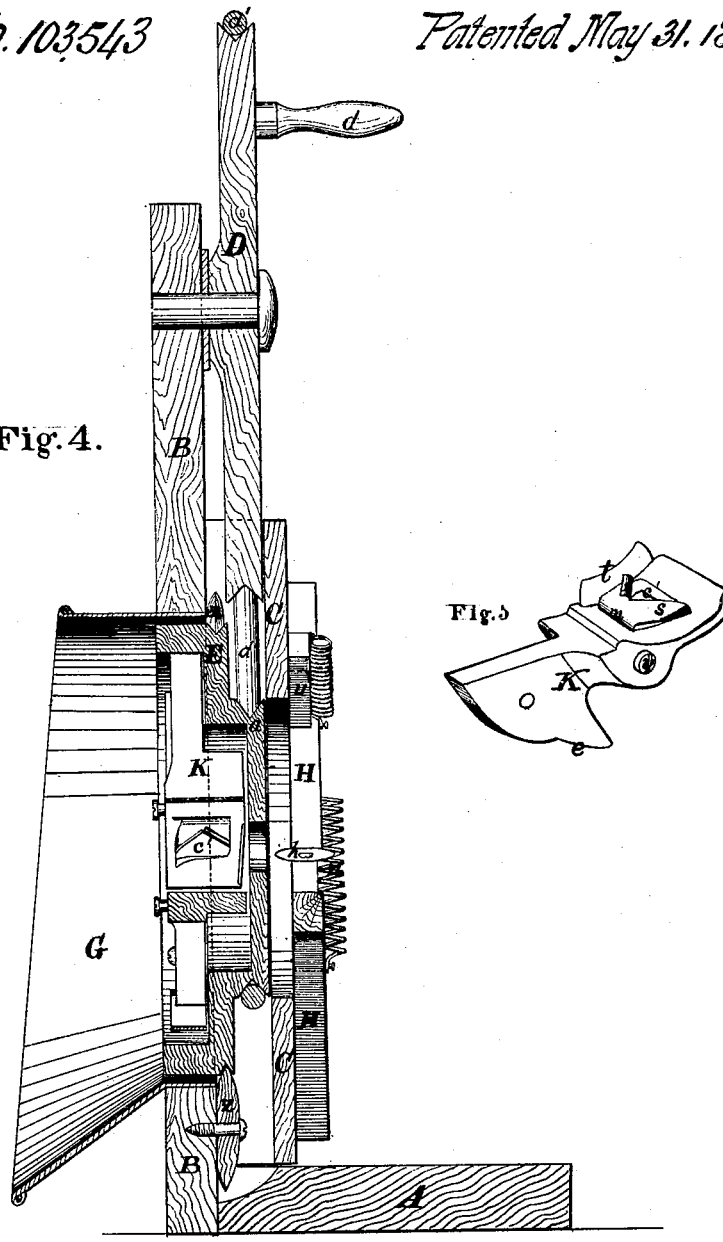

VOLNEY BARKER, OF OTISFIELD, MAINE.

Letters Patent No. 103,543, dated May 31, 1870.

IMPROVED GREEN-CORN CUTTER.

The Schedule referred to in these Letters Patent and making part of the same

*To all whom it may concern:*

Be it known that I, VOLNEY BARKER, of Otisfield, in the county of Cumberland and State of Maine, have invented a new and valuable Improvement in Green-corn Cutters; and I do hereby declare that the following is a full, clear, and exact description of the construction and operation of the same, reference being had to the annexed drawings making a part of this specification, and to the letters and figures of reference marked thereon.

Figure 1 of the drawings is a back view of my invention.

Figure 2 is a rear view, with hinged cover laid open.

Figure 3 is a front view of same.

Figure 4 is a central vertical section of same.

Figure 5 is a detached view of the knife, in perspective.

My invention relates to means for cutting the kernels of green corn from the cob, and consists, mainly, in certain improvements on my green-corn cutter patented November 9, 1869, whereby I am enabled to cut off the top or tender portion of the kernel, and scrape out the nutriment from the parts below, without any admixture of the tough husks.

More particularly described, the improvements on my old machine, above referred to, are—

First, the employment of a wheel, without shaft or axle, to bear the cutters, whereby they are brought nearer the guide-rollers, enabling a shorter cob to be passed.

Secondly, the use of pivoted arms to bear the guide-rollers, instead of sliding rods operating in sockets. Thus, a better view is given to the interior, and the clogging of the sockets dispensed with.

Thirdly, attaching the pivoted arms, above referred to, to a hinged plate, which can be opened to afford access to the interior of the machine.

Fourthly, attaching to the front plate, around the cutter-wheel, a flaring spout or funnel, whereby the juice and pulp are prevented from flying off by the centrifugal action of the cutter-wheel. In my old cutter, much waste can be ascribed to the absence of this funnel.

Fifthly, providing the knives with dull scrapers or pressing-edges in addition to the sharp cutting-edges shown in my old device. Thus, I am enabled to press out the juice and pulp without cutting off any of the tough hulls. This is a great improvement, and most important to those who can green corn.

The letter A of the drawings designates the bed-piece, to which is secured the upright plate B.

Hinged to this is the covering-plate C, arranged to protect the parts, and, at the same time, to carry the guides.

D designates the drive-wheel, having a handle, $d$.

A groove is made in its edge to carry the cord $d'$, which also passes over the pulley $a$ formed on the side of the knife-carrying wheel E. This wheel has no shaft, but is arranged with a groove in its perimeter, and provided with three button-wheels secured to the plate B. These button-wheels $z z z$ play in the groove of the wheel E, and thus keep it in proper position.

G designates a funnel, secured to the face of the plate B, around the knife-wheel.

H H are levers, bearing the guide-rollers $h\ h$. They are pivoted to the outer side of the plate C, and are arranged with coiled springs $n\ n$ and stops $u\ u$.

K K are the knives, pivoted to the wheel E, and governed by the springs $l\ l$ attached to the wheel and bearing on the projections $e\ e$ of the knives. The free ends of the knives are rectangular in form, and cast with central openings $c'$, through which the cuttings and scrapings pass. Here the blades are attached, secured around three sides of the rectangular opening in the manner shown.

There are three blades, having separate and peculiar offices. One of these blades, $t$, is attached to the inner side of the bearer K, and has a curved edge arranged to cut in a spiral direction around the ear. This is the feeding-blade, and by its operation the ear is drawn through the machine.

The tender tops of the grains are cut off by the shearing-knife $s$, whose edge is arranged to slant forward in a diagonal direction, as shown.

The pulp and juice are scraped from the husks by the scraper $r$, formed with a round dull edge, and arranged to slant forward in a direction almost at right angles with that of the blade $s$.

The shearing-blade $s$ and scraper $r$ are formed on the same piece of metal, $m$, the body of which constitutes a slide, whereby the ear may be cut and scraped to any depth at will.

$v$ designates a set-screw, to secure the blades after they are adjusted to the proper depth by means of the slide $m$.

The operation of my corn-cutter is as follows:

The ear is introduced by hand, butt-end first, into the opening formed by the knives, and pushed forward until the feeding-knives $t\ t$ begin to act, when the hand may be withdrawn. As there is no shaft to the knife-bearing wheel, the distance between the cutting-knives and the guide-rollers $h\ h$ is reduced to a minimum, and, therefore, shorter ears may be passed. The ear now moves readily forward, being kept from turning by the guide-rollers $h\ h$. As it progresses, the shearing-blades $s\ s$ first attack the kernels, cutting off the tops thereof. Then the scrapers $r\ r$ squeeze and press out the pulp and juice without detaching the tough hulls from the cob. The corn and juice fall into the cavities of the wheel E, and thence into the funnel G, which guides it into a suitable vessel. The funnel G also prevents the juice and corn from flying off by the centrifugal action of the wheel E.

The operation of the blades and scrapers is of the greatest importance. It has been found by those who can green corn that the admixture of the tough hulls tends to deteriorate the preparation. This admixture is entirely prevented by my arrangement of the dull scrapers $r\ r$, which prevent the cutting-blades $s\ s$ from cutting beyond a certain depth. These scrapers receive the whole force of the springs $l\ l$, and are therefore the gauge for the knives.

The machine is readily cleaned. The hinged plate C, carrying the guide-rollers, can be opened, and free access thereby had to the wheel E.

What I claim as my invention, and desire to secure by Letters Patent, is—

1. In a green-corn cutter, the cutter-wheel E, with grooved rim, arranged to bear on the three small wheels $z\ z\ z$, as specified.

2. The pivoted arms H H, in combination with the guide-rollers $h\ h$ of a green-corn cutter, constructed and arranged to operate as specified.

3. The hinged plate C, arranged to bear the guide-rollers, and to afford access to the interior of the corn-cutter, as specified.

4. In a green-corn cutter, the funnel or spout G, as specified.

5. The knives K K, provided with circular feeding-blades $t\ t$, shearing-blades $s\ s$. and dull scrapers $r\ r$, as specified.

In testimony that I claim the above, I have hereunto subscribed my name in the presence of two witnesses.

VOLNEY BARKER.

Witnesses:
 JOHN B. FOGG,
 GEORGE F. ANDREWS.